Patented Jan. 9, 1951

2,537,893

UNITED STATES PATENT OFFICE 2,537,893

2-CARBOALKOXY-3-KETO-4-ACYLAMIDO-TETRAHYDROTHIOPHENE

Stanton A. Harris, Westfield, N. J., assignor to Merck & Co., Inc., Rahway, N. J., a corporation of New Jersey No Drawing. Application September 16, 1944, Serial No. 554,450

15 Claims. (Cl. 260—329)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

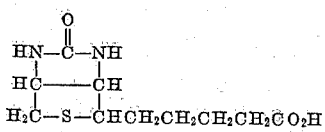

It is now found that this compound can be synthesized by reactions indicated as follows:

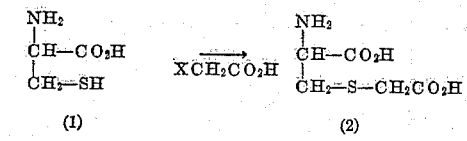

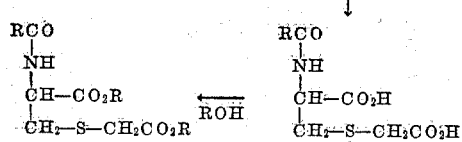

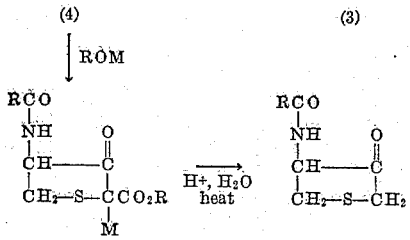

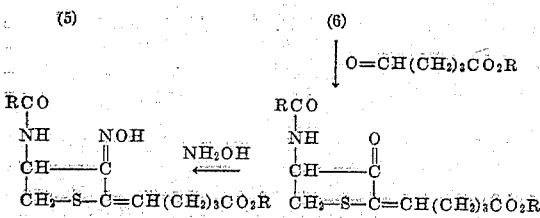

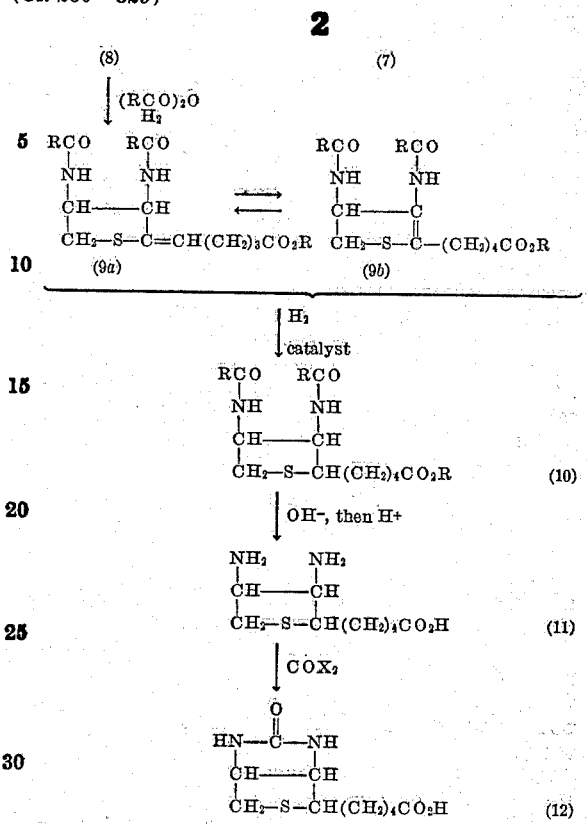

In the above formulae, R represents an alkyl, aryl or arylalkyl group; X, a halogen; and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxy-methylmercapto-propanoic acid (2); which is then treated with an acylating agent, such as an acyl halide, in an aqueous alkaline solution to yield 2-acylamido-3-carboxymethyl-mercapto-propanoic acid (3). This product is esterified using a mineral acid catalyst, to produce the diester (4) of the acid (3), and the diester is treated with alkali metal alcoholate or an alkaline earth metal alcoholate to yield the 2-alkali metal or the 2-alkaline earth metal derivative of an ester of 2-carboxy-3-keto-4-acylamido-tetrahydrothiophene (5). This compound, when heated with a dilute mineral acid, is hydrolyzed and decarboxylated to produce 3 - keto - 4 - acylamido - tetrahydrothiophene (6) which, when reacted with 4-carboxy-butanal ester in a lower aliphatic alcohol reaction medium containing piperidine and a lower aliphatic carboxylic acid, produes 2-(4'-carboalkoxybutylidene)-3-keto-4-acylamido-tetrahydrothiophene (7). This product, when reacted with hydroxylamine yields an ester of the corresponding oxime, 2-(4'-carboxy-butylidene)-3-isonitroso-4-acylamido-tetrahydrothiophene (8) which upon treatment with a mixture of zinc, a lower aliphatic acid and a lower aliphatic acid anhydride, produces an equilibrium mixture of 2-(4'-carboxy-butylidene)-3:4-di(acylamido)-tetrahydrothiophene ester (9a) and 2-(4'-carboxy-butyl)-3:4-di(acylamido)-4:5-dihydrothiophene ester (9b). This equilibrium mixture, or if preferred, one of the equilibrants, is then treated with hydrogen in the presence of a hydrogenation catalyst to yield 2-(4'-carboxy-butyl)-3:4-di(acylamido)-tetrahydrothiophene ester (10). When this last mentioned compound is treated with an aqueous alkaline solution, hydrolysis of the acyl groups occurs, yielding upon acidification, 2-(4'-carboxy-butyl)-3:4-diamino-tetrahydrothiophene (11) which, when reacted with a carbonyl halide, produces the compound 2-(4'-carboxy-butyl)-3:4-ureido-tetrahydrothiophene. This product is obtained as a mixture of stereoisomers, one of which is racemic biotin, from which upon resolution, is obtained the dextrorotatory isomer, biotin.

The present invention is concerned with intermediate 5 above, the ketone and the 2-alkali metal and 2-alkaline earth metal derivatives of the ketone 2-carbalkoxy-3-keto-4-acylamido-tetrahydrothiophene, represented by the formula:

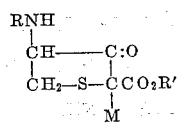

wherein R is an acyl group, R' is hydrogen or an alkyl, aryl or arylalkyl group, M is hydrogen, an alkali metal or an alkaline earth metal; and simple derivatives thereof involving the 3-keto functional group. The above intermediate compounds are converted into the vitamin biotin by the process steps above indicated as described in detail in concurrently filed applications, Serial Nos. 554,451, now Patent No. 2,508,457; 554,452, now Patent No. 2,452,653; 554,453, now Patent No. 2,460,224; 554,454, now Patent No. 2,459,817; 554,455, now Patent No. 2,487,050; 554,456, now abandoned; and 554,457, now abandoned.

According to the present invention, these compounds are obtained by treating a 2-acylamido-3-carboxymethylmercaptopropanoic diester, preferably in an aliphatic alcoholic reaction medium, with an alkali metal alcoholate or an alkaline earth metal alcoholate which causes formation of a heterocyclic nucleus. Upon treating the metal derivative thus obtained with dilute acid at room temperature (30° C.) or below, the corresponding free ester can be obtained, 2-carbalkoxy-3-keto-4-acylamido-tetrahydrothiophene. Treatment of the metal derivative or the free ester with reagents characterized by reactivity toward a keto group results in formation of simple derivatives involving the 3-keto functional group. The oxime, semi-carbazone, arylhydrazones and simple keto-addition products are representative of this class of derivatives.

The starting material utilized in practice of the present invention, 2-acylamido-3-carboxymethylmercapto-propanoic diester, can be prepared as described in the applications, Serial Nos. 554,449; and 554,458, now Patent No. 2,466,232, concurrently filed by the present inventor.

The following example illustrates a method of carrying out the present invention, but it is to be understood that this example is given by way of illustration and not of limitation.

*Example*

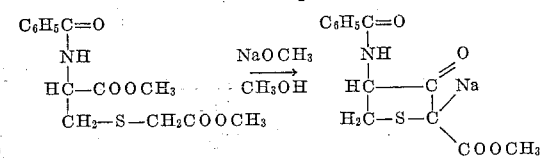

To a solution of about 770 g. of the dimethyl ester of 2-benzamido-3-carboxymethylmercapto-propanoic acid in approximately 500 cc. of methanol, about 57 g. of sodium dissolved in 100 cc. of methanol is added. The 2-sodium derivative of 2-carbomethoxy - 3 - keto-4-benzamido-tetrahydrothiophene separates from the reaction mixture and is removed by filtration, washed with methanol, and dried. When heated the product decomposes without melting.

In a similar manner other 2-acylamido-3-carboxymethylmercapto - propanoic diesters when treated with sodium alcoholate or another alkali metal or alkaline earth metal alcoholate yield corresponding 2-metal derivatives of 2-carbalkoxy-3-keto-4-acylamido-tetrahydrothiophene.

When treated with a dilute mineral acid, the 2-sodium derivative of 2-carbomethoxy-3-keto-4-benzamido-tetrahydrothiophene yields the corresponding free ester, 2-carbomethoxy-3-keto-4-benzamido-tetrahydrothiophene.

The corresponding oximino compound of the 3-keto free ester is prepared by mixing about 30 g. of the 2-sodium derivative of 2-carbomethoxy-3-keto-4-benzamido - tetrahydrothiophene with a chemically equivalent quantity of hydroxylamine hydrochloride in about 75 cc. of pyridine and allowing the mixture to stand for about 36 hours. Water is then added, the mixture is extracted with ether; the ether extract is washed with aqueous acid, dried, and concentrated to obtain an oil which is dissolved in methanol, ether is added, and a precipitate of 2-carbomethoxy-3-oximido-4-benzamino-tetrahydrothiophene (M. P. 155–157° C.) is obtained, which is separated by filtration. After removing this product crystals of an isomeric form of the oxime (M. P. 132–133° C.) are obtained from the filtrate.

The phenylhydrazone of the 3-keto free ester is prepared by mixing about 3 g. of the 2-sodium derivative of 2-carbomethoxy-3-keto-4-benzamido-tetrahydrothiophene in an aqueous solution with an aqueous solution of 1.44 g. of phenylhydrazine hydrochloride. A gummy mass is obtained which is treated with methanol causing evolution of heat, and the separation of the phenylhydrazone of 2-carbomethoxy-3-keto-4-benzamido - tetrahydrothiophene (M. P. 155–156° C.) which can be removed and purified by conventional operations In like manner the 2-sodium or other 2-metal derivatives can be reacted with other reagents capable of combining with ketones to produce corresponding derivatives. For example, members of this class of compounds can be reacted with semi-carbazide to form the corresponding semi-carbazone, or with nitrophenylhydrazine to yield the corresponding nitrophenylhydrazine, etc.

Compounds having other acylamido groups in place of the benzamido group present in the specific compound used in the process of the above example enter into analogous reactions with the reagents mentioned. Corresponding esters other than the methyl ester also react with these reagents in the manner above described.

Modifications may be made in carrying out the present invention without departing from the spirit and scope thereof and the invention is to be limited only by the appended claims.

What is claimed is:

1. A compound of the formula:

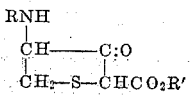

wherein R is an acyl group and R' is an alkyl radical.

2. A compound of the formula:

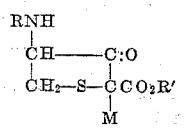

wherein R is an acyl group, R' is an alkyl radical and M is an alkali metal.

3. A compound of the formula:

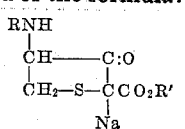

wherein R is an acyl group and R' is an alkyl radical.

4. A compound of the formula:

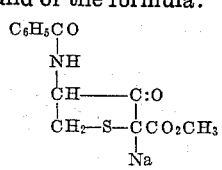

5. A compound of the formula:

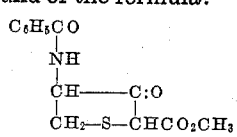

6. A compound selected from the class consisting of the ketone represented by the formula:

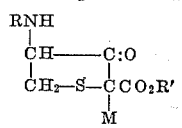

wherein R is an acyl group, R' is a radical selected from the class which consists of alkyl, aryl and arylalkyl radicals, and M is a radical selected from the class which consists of hydrogen and alkali metals, and the oxime, semicarbazone, and aryl-hydrazones of said ketone.

7. The process which comprises treating a compound represented by the formula:

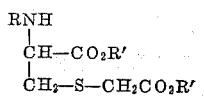

wherein R is an acyl group, and R' is a radical selected from the class which consists of alkyl, aryl and arylalkyl radicals, with a compound having the formula: R"OM, wherein R" is a lower alkyl radical, and M is an alkali metal, to produce a compound of the formula:

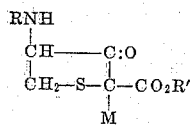

wherein R, R' and M have the significance above-defined.

8. The process which comprises treating a compound represented by the formula:

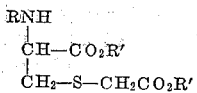

wherein R is an acyl group and R' is an alkyl radical, with an alkali metal alcoholate to produce a compound of the formula:

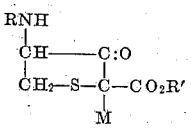

wherein M is an alkali metal, and R and R' have the significance above-defined.

9. The process which comprises treating a compound represented by the formula:

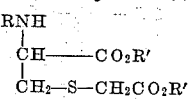

wherein R is an acyl group, and R' is an alkyl radical, with a sodium alcoholate to produce a compound of the formula:

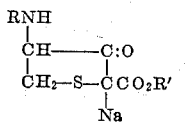

wherein R and R' have the significance above-defined.

10. The process which comprises treating a compound represented by the formula:

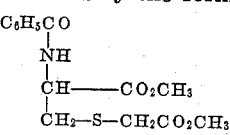

with sodium methylate to produce a compound of the formula:

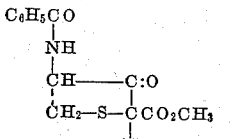

11. The process which comprises treating a compound represented by the formula:

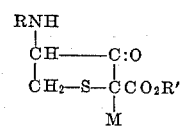

wherein R is an acyl group, R' is a radical selected from the class which consists of alkyl, aryl and arylalkyl radicals, and M is an alkali metal, with dilute acid at a temperature below about 30° C., to produce a compound having the formula:

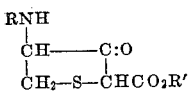

wherein R and R' have the significance above-defined.

12. The process which comprises treating a compound represented by the formula:

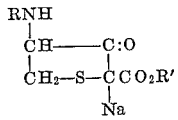

wherein R is an acyl group and R' is an alkyl radical, with dilute acid at a temperature below about 30° C., to produce a compound having the formula:

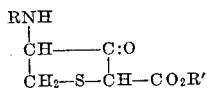

wherein R and R' have the significance above-defined.

13. The process which comprises treating a compound represented by the formula:

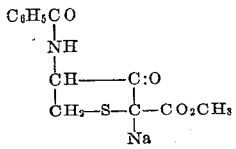

with dilute mineral acid at a temperature below about 30° C., to produce a compound of the formula:

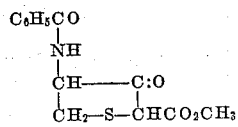

14. A tetrahydrothiophene compound represented by the following formula:

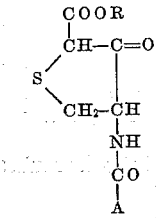

where the R is a lower alkyl group and A is selected from the group consisting of alkyl, aralkyl and aryl groups.

15. The compound represented by the formula of claim 14 where A is a phenyl group.

STANTON A. HARRIS.

REFERENCES CITED

The following references are of record in the file of this patent:

UNITED STATES PATENTS

| Number | Name | Date |
|---|---|---|
| 2,472,433 | Moore et al. | June 7, 1949 |